United States Patent
Virr

(10) Patent No.: US 7,194,995 B2
(45) Date of Patent: Mar. 27, 2007

(54) BEARING

(75) Inventor: Geoffrey Philip Virr, Southam (GB)

(73) Assignee: Menard Competition Technologies, Ltd. (GB)

( * ) Notice: Subject to any disclaimer, the term of this patent is extended or adjusted under 35 U.S.C. 154(b) by 0 days.

(21) Appl. No.: 10/845,889

(22) Filed: May 14, 2004

(65) Prior Publication Data

US 2005/0252479 A1   Nov. 17, 2005

(51) Int. Cl.
  *F01M 1/00* (2006.01)
  *F16C 33/10* (2006.01)
(52) U.S. Cl. .................................. 123/196 R; 384/288
(58) Field of Classification Search ............ 123/196 R, 123/197.3, 197.4; 384/288
See application file for complete search history.

(56) References Cited

U.S. PATENT DOCUMENTS

| | | | |
|---|---|---|---|
| 4,285,551 A | | 8/1981 | Suzuki et al. |
| 5,240,332 A | * | 8/1993 | Onishi et al. ............... 384/100 |
| 6,332,443 B1 | * | 12/2001 | Kaita .................... 123/196 R |

FOREIGN PATENT DOCUMENTS

| GB | 0410875.9 | 5/2004 |
|---|---|---|
| JP | 07208480 | 8/1995 |
| JP | 2001214922 | 8/2001 |

* cited by examiner

*Primary Examiner*—Stephen K. Cronin
*Assistant Examiner*—Hyder Ali
(74) *Attorney, Agent, or Firm*—McDermott Will & Emery LLP

(57) ABSTRACT

In one embodiment according to the invention, there is disclosed a bearing for surrounding a rotating shaft. The bearing comprises at least one external opening communicating with an exterior of the bearing; and at least one ramped internal cavity, each cavity communicating with one of the at least one external openings and an interior of the bearing. In another embodiment, there is disclosed a method for urging a lubricating fluid into an internal pressure gallery of a rotating shaft. The method comprises forming a first bearing to surround the rotating shaft, the first bearing comprising at least one external opening communicating with an exterior of the first bearing, and at least one ramped internal cavity, each cavity communicating with one of the at least one external openings and an interior of the first bearing, such that, in use, lubricating fluid in the at least one ramped internal cavity is pressurized as the rotating shaft rotates such that the lubricating fluid is urged into the internal pressure gallery. Further related embodiments are also disclosed.

41 Claims, 6 Drawing Sheets

BEARING

TECHNICAL FIELD

This invention relates to a novel bearing and methods for recovering lubricating fluid pressure in rotating machinery, and engines containing such bearings.

BACKGROUND

In order to lubricate bearings on a crankshaft of an internal combustion engine, prior art techniques have passed oil through openings in the crankshaft's main bearing, which transmit oil into an internal gallery of the crankshaft, as an opening in the crankshaft rotates past the openings in the bearing. The main bearing is typically a shell bearing, with holes passing through it, having a grooved interior to facilitate oil flows into the crankshaft. After passing through the main bearing, the entering oil passes through internal galleries in the crankshaft to subsequent bearings, such as the big end bearing. Mostly because of the effect of the spinning of the crankshaft, the entering oil undergoes a pressure drop between the external pressure gallery and the big end bearing; for instance, the oil may drop in pressure from 60 psi (4 bar) in the external pressure gallery down to 30 psi (2 bar) at the big end bearing, in a common automotive engine. Thus, because of this pressure drop, in order to achieve a desired oil pressure at the big end bearing, the external gallery must have a high oil pressure. Therefore, large pumps must be used to pressurize the external gallery, which add cost and weight to the engine. To alleviate such problems, attempts have been made to force oil through the end of the crankshaft, but these techniques have proved awkward and expensive.

SUMMARY

In one embodiment according to the invention, there is disclosed a bearing for passage of a lubricating fluid, the bearing comprising at least one opening communicating between an interior of the bearing and an exterior of the bearing, the opening being shaped to increase a pressure of the lubricating fluid as it flows past the opening, such that the bearing acts to urge the lubricating fluid in one direction between the interior and the exterior of the bearing.

In further related embodiments, the or each opening may comprise a ramped cavity on an internal surface such that it acts to urge the lubricating fluid toward the interior of the bearing. The or each opening may be ramped in two directions, to form an internal cavity comprising on one side of the opening first a long ramp and a second relatively short ramp on the other side of the opening. The or each ramp may be curved. A first ramp may comprise a long radius of curvature and a second ramp may comprise a relatively short radius of curvature. The or each ramp may be substantially flat. The bearing may be provided in an engine. The bearing may be a main bearing of a crankshaft of an internal combustion engine. The bearing may act to urge oil from the exterior of the main bearing to an internal pressure gallery of the crankshaft.

In another embodiment according to the invention, there is disclosed a method for encouraging passage of a lubricating fluid through a bearing. The method comprises forming a plurality of openings communicating between an interior of the bearing and an exterior of the bearing, the openings being shaped to increase a pressure of the lubricating fluid as it flows past the openings, such that the shape of the openings acts to urge the lubricating fluid in one direction between the interior and the exterior of the bearing.

In further related embodiments, the method may comprise forming a plurality of ramped openings. The method may also comprise forming each of the plurality of ramped openings by forming a first ramp having a longer radius of curvature and a second ramp having a shorter radius of curvature. The method also may comprise forming the ramped openings on the interior surface of the bearing. The bearing may act to urge the lubricating fluid into or out of the interior of the bearing. The or each ramp may be substantially flat. The bearing may be a main bearing of a crankshaft of an internal combustion engine. The bearing may act to urge oil from the exterior of the main bearing to an internal pressure gallery of the crankshaft.

In another embodiment according to the invention, there is disclosed a bearing and rotatable shaft supported within the bearing, the bearing comprising at least one external opening communicating with an exterior of the bearing, wherein at least one of the bearing and shaft comprises a ramped cavity, each cavity communicating with one of the at least one external openings and an interior of the shaft such that, in use, a lubricating fluid is urged in one direction between the external opening and the interior of the shaft.

In further related embodiments, the rotating shaft may comprise an internal pressure gallery for receiving lubricating fluid pressurized in the at least one ramped cavity as the shaft rotates. The bearing may comprise the main bearing of a crankshaft and the or each ramped cavity may be provided on an internal surface thereof. Each of the at least one ramped cavities may comprise a longer portion having a greater radius of curvature than a radius of curvature of a shorter portion of the ramped cavities. The bearing may comprise more of the at least one ramped cavities on one side of a centreline in a radial plane of the bearing than on the other side of the centreline. The bearing may comprise four ramped cavities on one side of the centreline and two ramped internal cavities on the other side of the centreline. The bearing may comprise a shell bearing. The bearing may comprise a material selected from steel, metal alloy, carbon fibre, and a ceramic material.

In another embodiment according to the invention, there is disclosed an engine comprising a rotating shaft, the engine comprising: a first bearing on the rotating shaft, the first bearing comprising at least one external opening communicating with an external pressure gallery, and at least one ramped internal cavity, each cavity communicating with one of the at least one external openings and an interior of the first bearing; and an internal pressure gallery of the rotating shaft for receiving lubricating fluid pressurized in the at least one ramped internal cavity as the rotating shaft rotates, the internal pressure gallery communicating with a second bearing on the rotating shaft.

In further related embodiments, the rotating shaft may comprise a crankshaft of an internal combustion engine. The first bearing may comprise a main bearing of the crankshaft, and the second bearing may comprise a big end bearing of the crankshaft. Each of the at least one ramped internal cavities may comprise a longer portion having a greater radius of curvature than a radius of curvature of a shorter portion of the ramped internal cavities. The first bearing may comprise more of the at least one ramped internal cavities on one side of a centreline in a radial plane of the first bearing than on the other side of the centreline. The first bearing may comprise four ramped internal cavities on one side of the centreline and two ramped internal cavities on the other side of the centreline. The first bearing may comprise a shell bearing. The first bearing may comprise a material selected from steel, metal alloy, carbon fibre, and a ceramic material. The crankshaft may comprise a drilling selected from a low pressure drilling, an intermediate pressure drilling, and a high pressure drilling.

In another embodiment according to the invention, there is disclosed a method for urging a lubricating fluid into an internal pressure gallery of a rotating shaft, the method comprising: forming a first bearing to surround the rotating shaft, the first bearing comprising at least one external opening communicating with an exterior of the first bearing, and at least one ramped internal cavity, each cavity communicating with one of the at least one external openings and an interior of the first bearing, such that, in use, lubricating fluid in the at least one ramped internal cavity is pressurized as the rotating shaft rotates such that the lubricating fluid is urged into the internal pressure gallery.

In further related embodiments, the internal pressure gallery may communicate between the at least one ramped internal cavity and a second bearing on the rotating shaft. The rotating shaft may comprise a crankshaft of an internal combustion engine. The first bearing may comprise a main bearing of a crankshaft on an internal combustion engine, and the second bearing may comprise a big end bearing of the crankshaft. Each of the at least one ramped internal cavities may comprise a longer portion having a greater radius of curvature than a radius of curvature of a shorter portion of the ramped internal cavities. The first bearing may comprise more of the at least one ramped internal cavities on one side of a centreline in a radial plane of the first bearing than on the other side of the centreline. The first bearing may comprise four ramped internal cavities on one side of the centreline and two ramped internal cavities on the other side of the centreline. The first bearing may comprise a shell bearing. The first bearing may comprise a material selected from steel, metal alloy, carbon fibre, and a ceramic material. The internal pressure gallery comprises a drilling selected from a low pressure drilling, an intermediate pressure drilling, and a high pressure drilling.

Additional advantages and novel features of the invention will be set forth in part in the description which follows, and in part will become apparent to those skilled in the art upon examination of the following and accompanying drawings or may be learned by practice of the invention.

BRIEF DESCRIPTION OF THE DRAWINGS

For a better understanding of the present invention, and as to how the same may be carried into effect, reference will now be made, by way of example only, to the accompanying drawings, in which.

DETAILED DESCRIPTION

Figure 1:
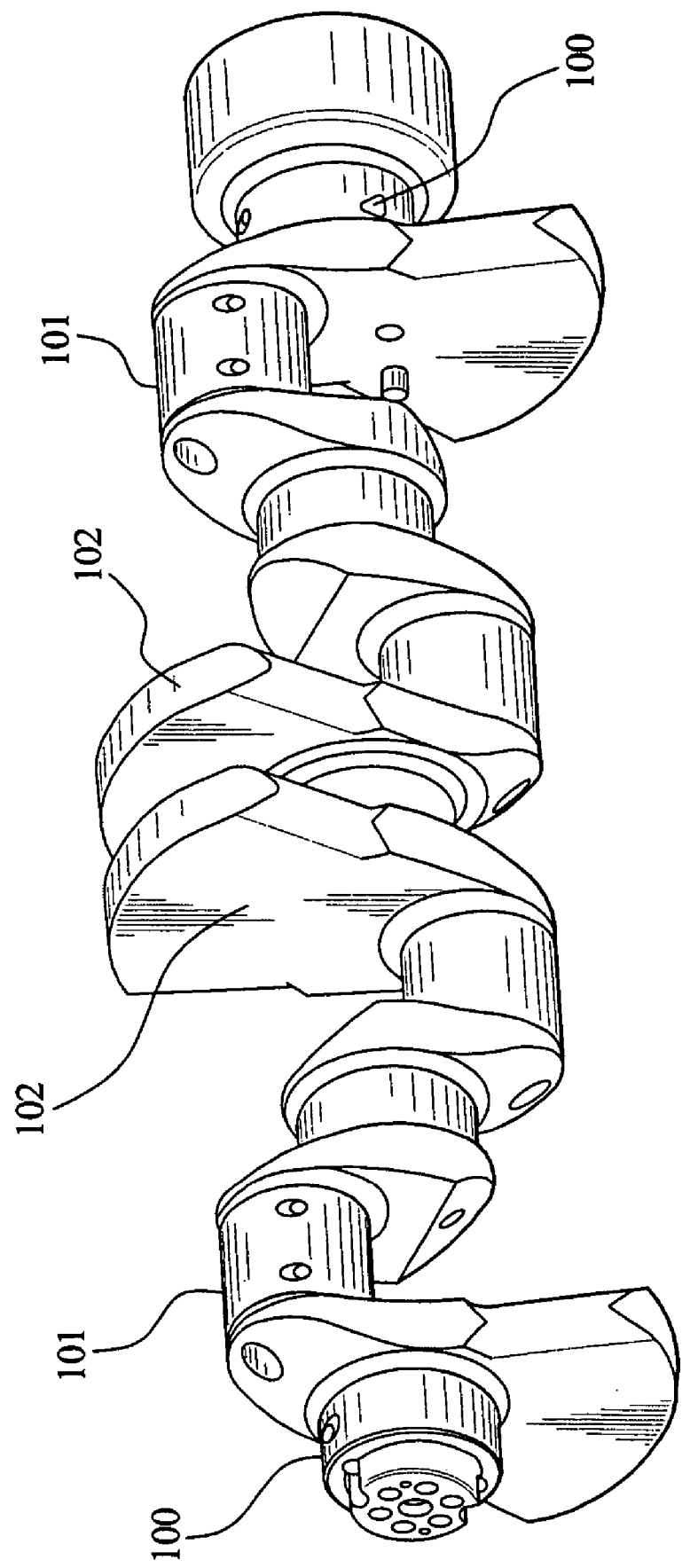
FIG. 1 is a three-dimensional view of a crankshaft, with which a bearing according to an embodiment of the invention may be used.

FIG. 1 shows a three-dimensional view of a crankshaft of an internal combustion engine, with which an embodiment of the invention may be used. A main bearing surrounds a main bearing section 100 of the crankshaft; and a big end bearing surrounds a big end section 101 of the crankshaft, which drives the pistons via connecting rods. The big end sections 101 are followed by counterweights 102.

As discussed above, prior art techniques for lubricating the crankshaft bearings required high oil pressures in the external galleries surrounding the main bearing, necessitating the use of large oil pumps, with attendant weight and expense. By contrast, in an embodiment according to the invention, illustrated in FIGS. 2A–2E, a main bearing 200 uses a plurality of ramped internal cavities 201–206 to assist in pumping oil into the main bearing 200, thereby reducing the external oil pressure required to achieve a given oil pressure at the big end bearing. Incoming oil from outside the bearing travels in through external openings 207–212, and the opening of the crankshaft's internal gallery rotates past the bearing's internal cavities 201–206. As it does so, the oil is squeezed up ramped internal cavities 201–206, creating a hydrodynamic film, and increasing the local oil pressure. The ramped shape of the internal cavities 201–206 thereby effectively assists in pumping the oil through the bearing 200 and into the crankshaft's internal gallery.

The main bearing 200 of the embodiments of FIGS. 2A–2E has a number of advantages over prior art techniques for lubricating the crankshaft bearings. Because in use, the ramped internal cavities 201–206 assist in urging oil through the bearing and into the crankshaft's internal gallery, the oil pressure drop between the external pressure gallery and the big end bearing is reduced. For example, a previous technique may have required an external oil pressure of 60 psi (4 bar) to achieve a big end bearing pressure of 30 psi (2 bar) for a given crankshaft design, in a typical automotive engine. However, using a main bearing 200 according to the embodiment of FIGS. 2A–2E, an external oil pressure of only 40 psi (2⅔ bar) is required to achieve the same 30 psi (2 bar) pressure at the big end bearing. Thus, because the oil pressure in the external gallery is reduced, the pump used to pressurize the oil in the external gallery can be smaller; which means that the engine can be lighter, less expensive, and use less material. Also, the engine can have a smaller oil volume, so that the engine loses less heat to the oil and a leaner fuel mixture can be used, thereby increasing fuel economy. The reduced oil volume also requires less oil pumping during the engine's use; and less scavenging-out. The durability of components, such as the big end bearings, is increased. Smaller oil cooling mechanisms can be used.

Cooling openings in the outside body of a vehicle in which the engine is used, can be smaller, resulting in less air drag on the vehicle.

Figure 2C:
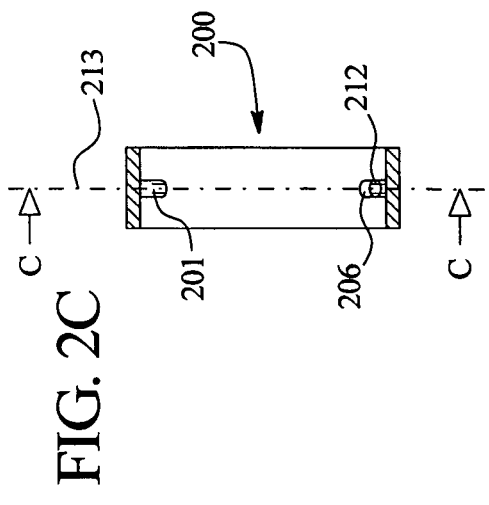
FIG. 2C is a cross-section of a main bearing according to an embodiment of the invention, through a plane perpendicular to a radial plane of the bearing, viewed in a direction opposite to that of FIG. 2A.
Figure 2B:
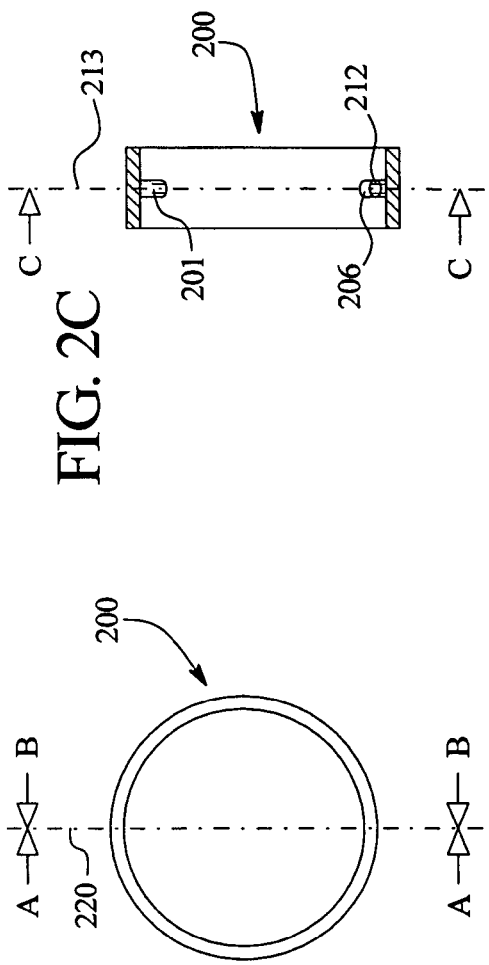
FIG. 2B is a side view of a main bearing according to an embodiment of the invention.
Figure 2A:
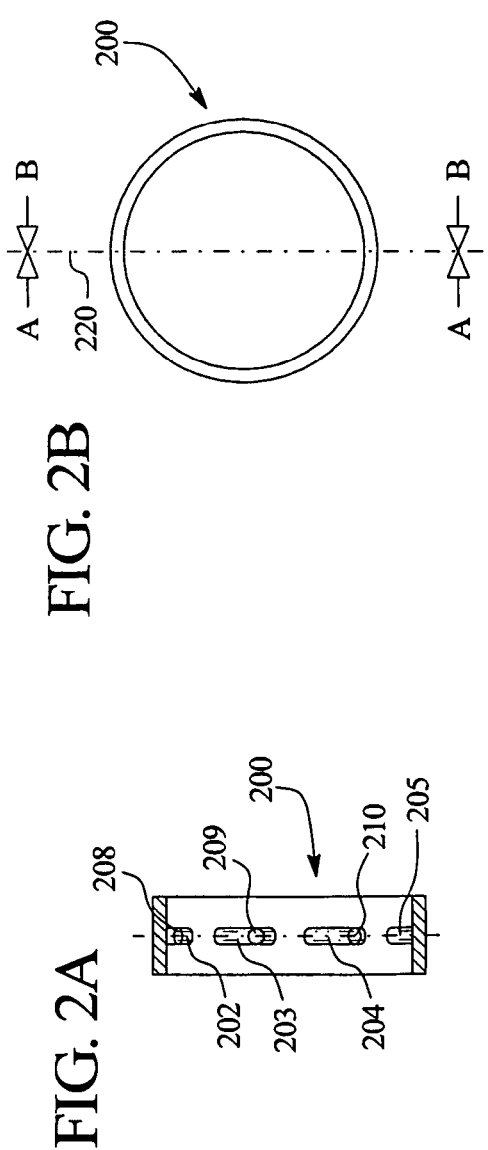
FIG. 2A is a cross-section of a main bearing according to an embodiment of the invention, through a plane perpendicular to a radial plane of the bearing.
Figure 2E:
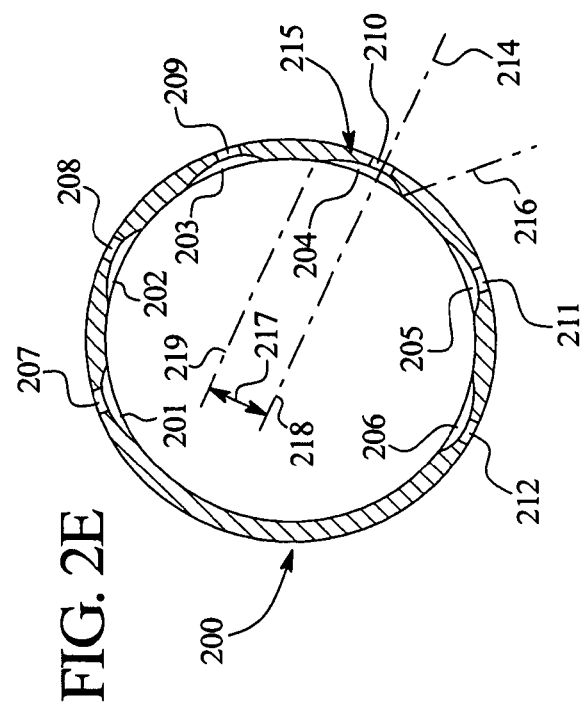
FIG. 2E is a cross-section of a main bearing according to an embodiment of the invention, in a plane parallel to the radial plane of the bearing.

Returning to the embodiment of FIGS. 2A–2E, FIG. 2E shows a cross-section C—C of main bearing 200 through axis 213 of FIG. 2C. As can be seen in FIG. 2E, the main bearing 200 has a plurality of ramped internal cavities 201–206, each opening into one of a plurality of external openings 207–212. Oil passes from an external pressure gallery surrounding the main bearing 200, through the external openings 207–212, and into the ramped internal cavities 201–206. An opening into the internal pressure gallery of the crankshaft rotates past the ramped internal cavities 201–206, so that oil is pumped into the crankshaft's internal gallery, and through to the big end bearing in section 101 of the crankshaft (FIG. 1). As shown in FIG. 2E, the main bearing 200 preferably has six cavities 201–206, with four on one side of a centreline and two on the other side of the centreline; but other numbers of cavities, and spacings of the cavities around the bearing, may be used. The main bearing 200 is here a shell bearing, but the invention may also be adapted to other forms of bearings. As an example of possible dimensions, the main bearing 200 may have a thickness 214 of 1.5 mm from the inside of the shell to the outside; the radius of curvature of the longer portion 215 of the ramped internal cavities may be 18.63 mm; the radius of curvature of the shorter portion 216 of the ramped internal cavities may be 5.03 mm; and the distance 217 between the centreline 218 and the edge line 219 of the longer curve of the ramped internal cavities, may be 11.47 mm. However, these dimensions are not limiting, and other dimensions may be used in accordance with embodiments of the invention. For example, the ramped channel(s) or cavities may be flats as opposed to curved.

Figure 2D:
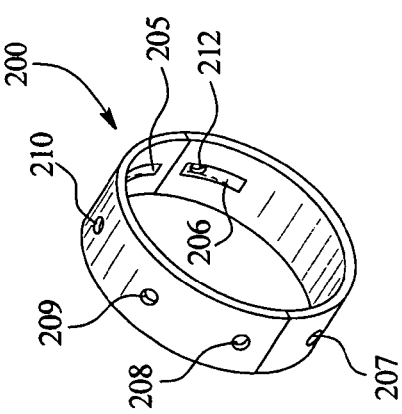
FIG. 2D is a three-dimensional view of a main bearing according to an embodiment of the invention, looking from above a set of external openings in the bearing.

In the other views of the embodiment of FIGS. 2A–2E, FIG. 2A shows a cross-section A—A of main bearing 200 through axis 220 of FIG. 2B; FIG. 2B shows a side-view of the main bearing 200; FIG. 2C shows a cross-section B—B through axis 220 of FIG. 2B; and FIG. 2D shows a three-dimensional view of bearing 200 from above external openings 208–210.

Figure 3:
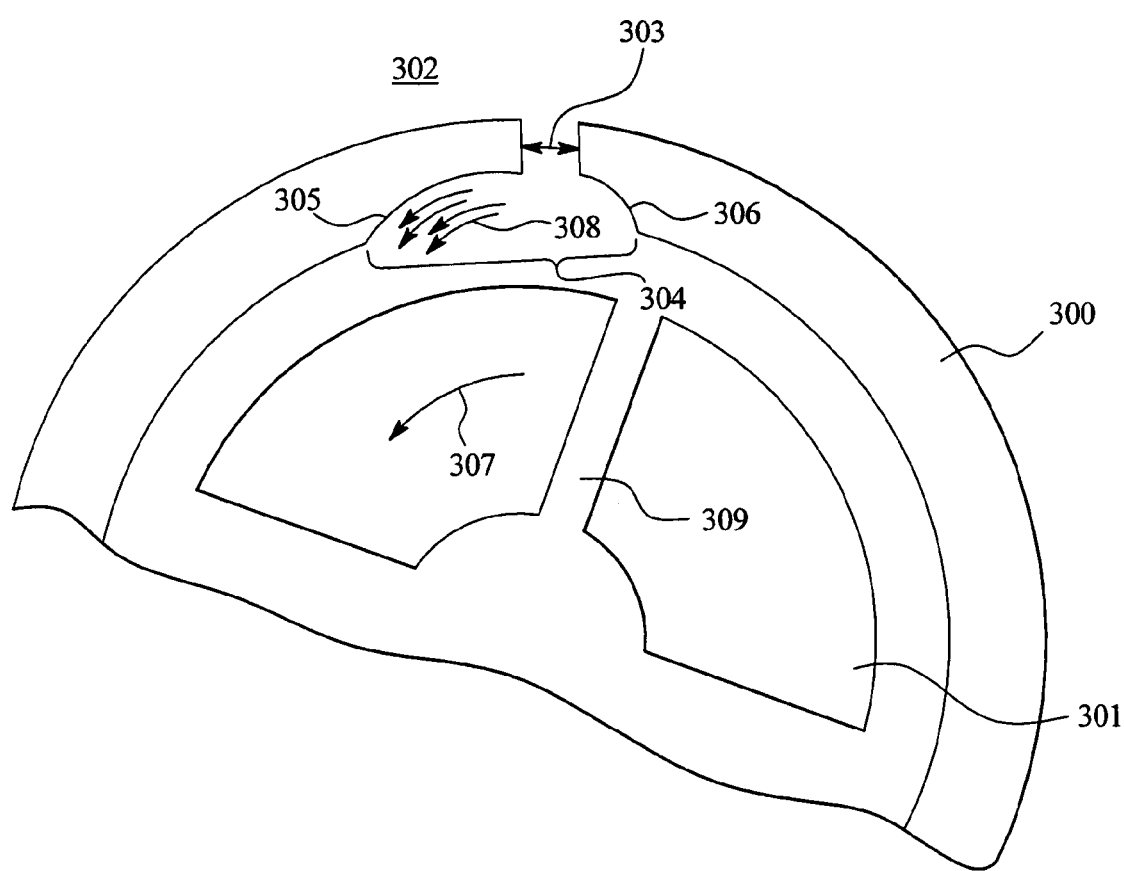
FIG. 3 is a cross-section of the main bearing surrounding the crankshaft, in accordance with an embodiment of the invention.

FIG. 3 shows a cross-section of the main bearing 300 surrounding the crankshaft 301, in accordance with an embodiment of the invention. In use, oil in the external gallery 302 flows through an external opening 303 in the main bearing, and into a ramped internal cavity 304, which has a portion with a longer radius of curvature 305 and a portion with a shorter radius of curvature 306. As the crankshaft 301 rotates in the direction indicated by arrow 307 (i.e. from the short radii ramp toward the longer radii ramp), frictional forces drag inbound oil along the internal surface of the long ramp. As the pressure towards the lower volume end of the cavity 304 grows the oil is urged in the direction of arrows 308 (i.e. with a major component of motion towards the centre of rotation of the crankshaft). This arrangement in effect uses a hydrodynamic pressure action which "pumps" the oil in the direction of the drilling 309 and against the action of the centripetal forces generated by the rotation of the crankshaft and oil. Because of the increased oil pressure 308 in the ramped internal cavity 304, the oil will be urged down into the internal pressure gallery 309 of the crankshaft as the internal pressure gallery 309 rotates past the ramped internal cavity 304. From the internal gallery 309, the oil is conducted to the big end bearing further along the crankshaft. In this way, an embodiment according to the invention assists the flow of oil from external gallery 302 into the internal pressure gallery 309 and to the big end bearing, thereby reducing the oil pressure required in the external gallery 302.

Figure 4:
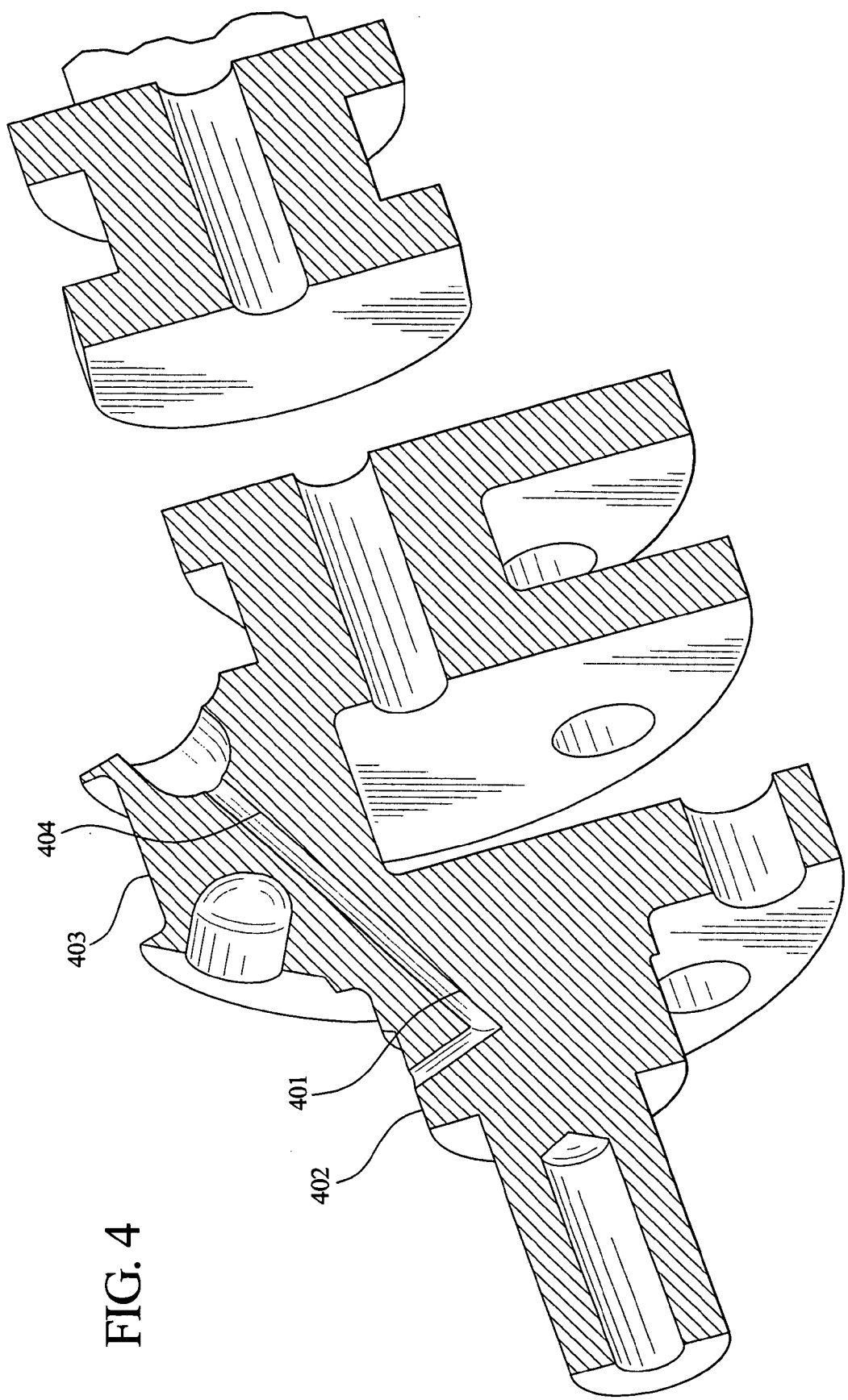
FIG. 4 is a crankshaft having an intermediate pressure drilling, with which an embodiment according to the invention may be used.
Figure 5:
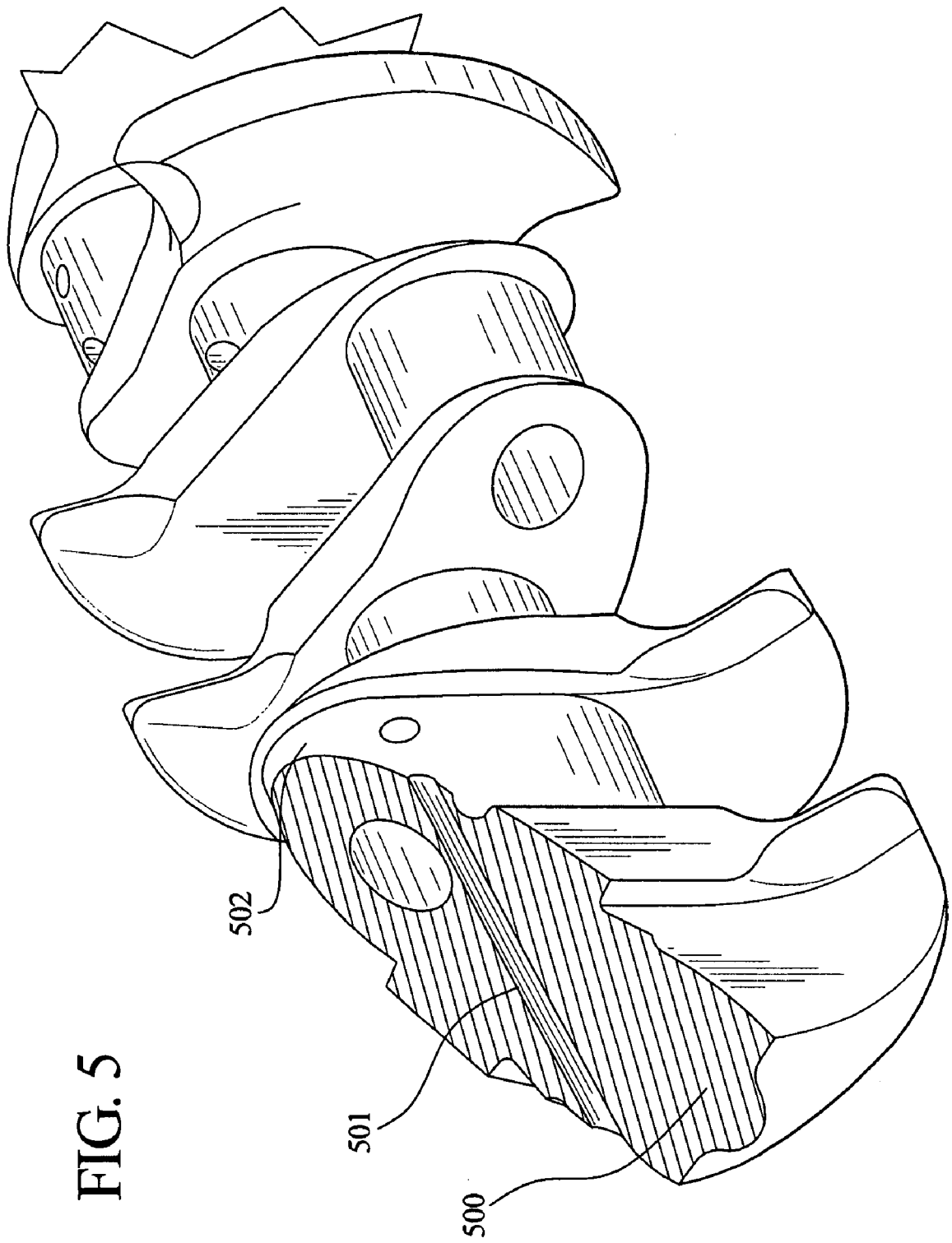
FIG. 5 is a crankshaft having a high pressure drilling, with which an embodiment according to the invention may be used.
Figure 6:
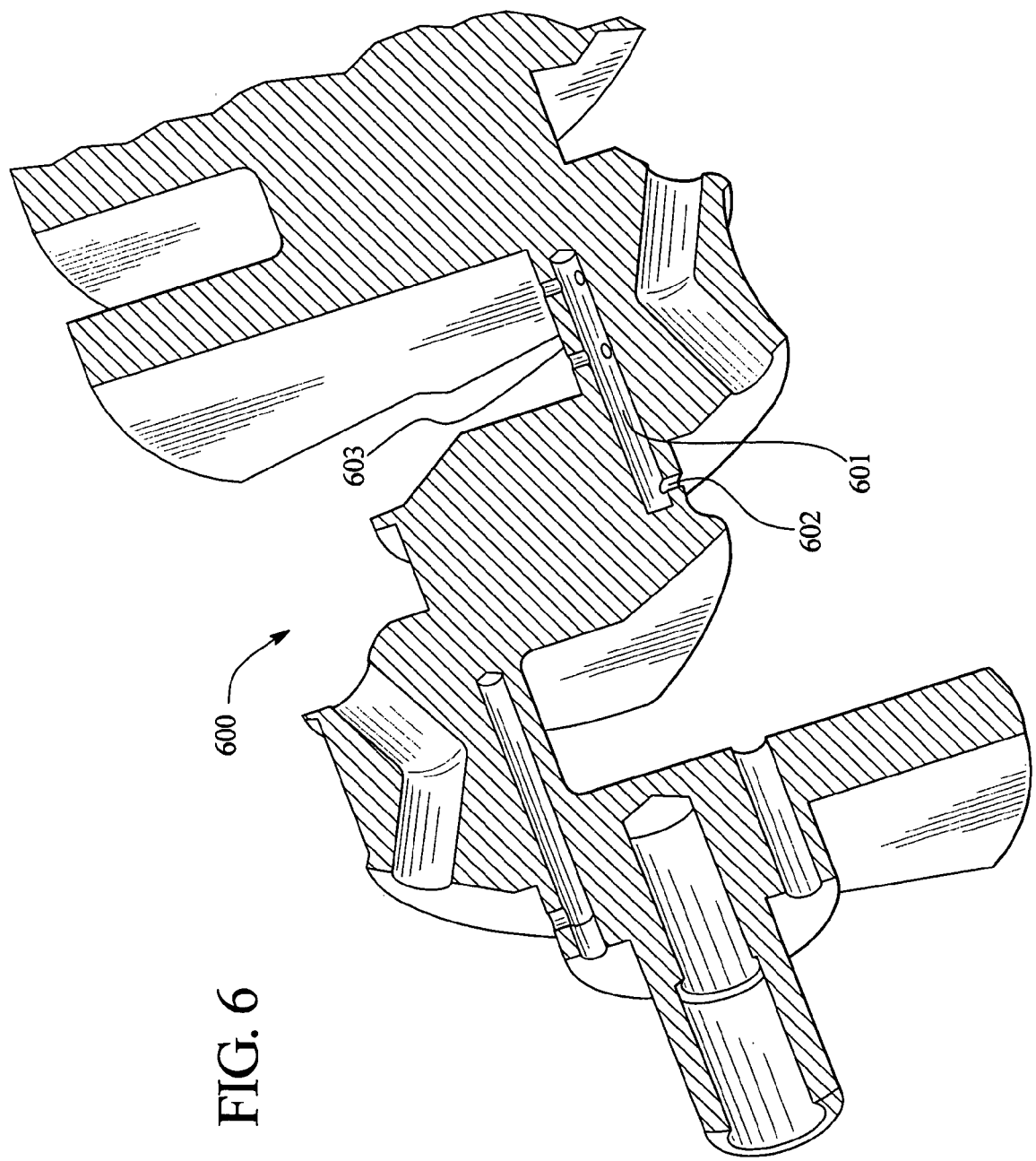
FIG. 6 is a crankshaft having a low pressure drilling, with which an embodiment according to the invention may be used.

A main bearing 200 according to an embodiment of the invention may be used with a variety of different crankshaft designs, see for example, the embodiments of FIGS. 4–6. In the embodiment of FIG. 4, an intermediate pressure drilling 401 is used for the crankshaft internal gallery, which connects a main bearing section 402 with a big end bearing section 403. A drilling 404 may connect the crankshaft internal gallery with the big end bearing. Alternatively, with reference to FIG. 5, a main bearing according to an embodiment of the invention may be used with a mirror drilled crankshaft 500, in which a high pressure drilling 501 connects the main bearing section to the big end bearing section 502. Similarly, with reference to FIG. 6, a main bearing according to an embodiment of the invention may be used with a low pressure drilled crankshaft 600, in which a low pressure drilling 601 connects the main bearing section 602 to the big end bearing section 603. Other crankshaft designs may be used in accordance with the invention.

Although an embodiment according to the invention has been illustrated as a bearing for a crankshaft in an internal combustion engine, the invention is not be limited to this application. For example, an embodiment according to the invention may be used in other contexts in which it is useful to reduce the lubricating fluid pressure in rotating machinery, by assisting the flow of the fluid through a bearing. It will also be appreciated that a variety of suitable materials may be used for performance of the invention, such as steel or metal alloys, carbon fibre materials, and ceramic materials. This list is not limiting.

It is also possible, in accordance with an embodiment of the invention, to use a bearing and ramped channel to assist in urging fluid from the inside of a bearing to its outside. In this case, for example, the ramped cavities of FIG. 2E can be positioned on the outside of the crank opposite an opening in the bearing. Other modifications can be envisaged by those of skill in the art, upon reading the description herein, to suit a variety of different applications.

Those of skill in the art will also appreciate that while the foregoing has described what is considered to be the best mode and, where appropriate, other modes of performing the invention, the invention should not be limited to the specific configurations and methods disclosed in this description of the preferred embodiment. Those skilled in the art will recognise that the invention has a broad range of applications in many different types of rotating machinery using bearings, and that the embodiments may take a wide range of modifications without departing from the inventive concept. For example, the invention has applications in all manner of combustion engines, for example, engines in road vehicles, specialist vehicles, ships and trains; but will have particular application where a low supply fluid pressure, such as a low gallery oil pressure, is important or useful.

What is claimed is:

1. A bearing for passage of a lubricating fluid, the bearing comprising at least one opening communicating between an interior of the bearing and an exterior of the bearing, the opening being shaped to increase a pressure of the lubricating fluid as it flows past the opening, such that the bearing acts to urge the lubricating fluid toward the interior of the bearing wherein at least one opening comprises a ramped cavity on an internal surface such that it acts to urge the lubricating fluid toward the interior of the bearing.

2. A bearing according to claim 1, wherein at least one opening is ramped in two directions, to form an internal cavity comprising on one side of the opening first a long ramp and a second relatively short ramp on the other side of the opening.

3. A bearing according to claim 1, wherein at least one ramp is curved.

4. A bearing according to claim 3, wherein a first ramp comprises a long radius of curvature and a second ramp comprises a relatively short radius of curvature.

5. A bearing according to claim 1, wherein at least one ramp is substantially flat.

6. A bearing according to claim 1, provided in an engine.

7. A bearing according to claim 1, wherein the bearing is a main bearing of a crankshaft of an internal combustion engine.

8. A bearing according to claim 7, wherein the bearing acts to urge oil from the exterior of the main bearing to an internal pressure gallery of the crankshaft.

9. A method for encouraging passage of a lubricating fluid through a bearing, the method comprising:
   forming a plurality of substantially flat ramped openings communicating between an interior of the bearing and an exterior of the bearing, at least one of the openings being shaped to increase a pressure of the lubricating fluid as it flows past the opening and urge the lubricating fluid toward the interior of the bearing.

10. A method according to claim 9, comprising forming each of the plurality of ramped openings by forming a first ramp having a longer radius of curvature and a second ramp having a shorter radius of curvature.

11. A method according to claim 9, comprising forming the ramped openings on the interior surface of the bearing.

12. A method according to claim 9, wherein the bearing is a main bearing of a crankshaft of an internal combustion engine.

13. A method according to claim 12, wherein the bearing acts to urge oil from the exterior of the main bearing to an internal pressure gallery of the crankshaft.

14. A bearing and rotatable shaft supported within the bearing, the bearing comprising at least one external opening communicating with an exterior of the bearing, wherein at least one of the bearing and shaft comprises a ramped cavity, each cavity communicating with one of the at least one external openings and an interior of the shaft such that, in use, a lubricating fluid is urged in one direction between the external opening and the interior of the shaft, wherein the rotating shaft comprises an internal pressure gallery for receiving lubricating fluid pressurized in the at least one ramped cavity as the shaft rotates.

15. A bearing according to claim 14, wherein the bearing comprises the main bearing of a crankshaft and the or each ramped cavity is provided on an internal surface thereof.

16. A bearing according to claim 15, wherein each of the at least one ramped cavities comprises a longer portion having a greater radius of curvature than a radius of curvature of a shorter portion of the ramped cavities.

17. A bearing according to claim 15, wherein the bearing comprises more of the at least one ramped cavities on one side of a centreline in a radial plane of the bearing than on the other side of the centreline.

18. A bearing according to claim 17, wherein the bearing comprises four ramped cavities on one side of the centreline and two ramped internal cavities on the other side of the centreline.

19. A bearing according to claim 14, wherein the bearing comprises a shell bearing.

20. A bearing according to claim 14, wherein the bearing comprises a material selected from steel, metal alloy, carbon fibre, and a ceramic material.

21. An engine comprising a rotating shaft, the engine comprising:
   a first bearing on the rotating shaft, the first bearing comprising at least one external opening communicating with an external pressure gallery, and at least one ramped internal cavity, each cavity communicating with one of the at least one external openings and an interior of the first bearing; and
   an internal pressure gallery of the rotating shaft for receiving lubricating fluid pressurized in the at least one ramped internal cavity as the rotating shaft rotates, the internal pressure gallery communicating with a second bearing on the rotating shaft.

22. An engine according to claim 21, wherein the rotating shaft comprises a crankshaft of an internal combustion engine.

23. An engine according to claim 22, wherein the first bearing comprises a main bearing of the crankshaft, and wherein the second bearing comprises a big end bearing of the crankshaft.

24. An engine according to claim 22, wherein the crankshaft comprises a drilling selected from a low pressure drilling, an intermediate pressure drilling, and a high pressure drilling.

25. An engine according to claim 21, wherein each of the at least one ramped internal cavities comprises a longer portion having a greater radius of curvature than a radius of curvature of a shorter portion of the ramped internal cavities.

26. An engine according to claim 21, wherein the first bearing comprises more of the at least one ramped internal cavities on one side of a centreline in a radial plane of the first bearing than on the other side of the centreline.

27. An engine according to claim 26, wherein the first bearing comprises four ramped internal cavities on one side of the centreline and two ramped internal cavities on the other side of the centreline.

28. An engine according to claim 21, wherein the first bearing comprises a shell bearing.

29. An engine according to claim 21, wherein the first bearing comprises a material selected from steel, metal alloy, carbon fibre, and a ceramic material.

30. A method for urging a lubricating fluid into an internal pressure gallery of a rotating shaft, the method comprising:
   forming a first bearing to surround the rotating shaft, the first bearing comprising at least one external opening communicating with an exterior of the first bearing, and at least one ramped internal cavity, each cavity communicating with one of the at least one external openings and an interior of the first bearing,
   such that, in use, lubricating fluid in the at least one ramped internal cavity is pressurized as the rotating shaft rotates such that the lubricating fluid is urged into the internal pressure gallery.

31. A method according to claim 30, wherein the internal pressure gallery communicates between the at least one ramped internal cavity and a second bearing on the rotating shaft.

32. A method according to claim 31, wherein the first bearing comprises a main bearing of a crankshaft on an internal combustion engine, and wherein the second bearing comprises a big end bearing of the crankshaft.

33. A method according to claim 31, wherein the internal pressure gallery comprises a drilling selected from a low pressure drilling, an intermediate pressure drilling, and a high pressure drilling.

34. A method according to claim 30, wherein the rotating shaft comprises a crankshaft of an internal combustion engine.

35. A method according to claim 30, wherein each of the at least one ramped internal cavities comprises a longer portion having a greater radius of curvature than a radius of curvature of a shorter portion of the ramped internal cavities.

36. A method according to claim 30, wherein the first bearing comprises more of the at least one ramped internal cavities on one side of a centreline in a radial plane of the first bearing than on the other side of the centreline.

37. A method according to claim 36, wherein the first bearing comprises four ramped internal cavities on one side of the centreline and two ramped internal cavities on the other side of the centreline.

38. A method according to claim 30, wherein the first bearing comprises a shell bearing.

39. A method according to claim 30, wherein the first bearing comprises a material selected from steel, metal alloy, carbon fibre, and a ceramic material.

40. A main bearing of a crankshaft of an internal combustion engine for passage of a lubricating fluid, the bearing comprising at least one opening communicating between an interior of the bearing and an exterior of the bearing, the opening being shaped to increase a pressure of the lubricating fluid as it flows past the opening, such that the bearing acts to urge the lubricating fluid from the exterior of the main bearing to an internal pressure gallery of the crankshaft.

41. A method for encouraging passage of a lubricating fluid through a main bearing of a crankshaft of an internal combustion engine, the method comprising:
forming a plurality of openings communicating between an interior of the bearing and an exterior of the bearing, at least one of the openings being shaped to increase a pressure of the lubricating fluid as it flows past the opening and urge the lubricating fluid from the exterior of the main bearing to an internal pressure gallery of the crankshaft toward the interior of the bearing.

* * * * *